(12) United States Patent
Rath

(10) Patent No.: US 9,932,965 B2
(45) Date of Patent: Apr. 3, 2018

(54) VERTICAL WIND GENERATOR

(71) Applicant: Thorsten Rath, Uhldingen-Muehlhofen (DE)

(72) Inventor: Siegfried Franz Rath, Moettingen-Kleinsoeheim (DE)

(73) Assignee: Thorsten RATH, Uhldingen-Muehlhofen (DE)

( * ) Notice: Subject to any disclaimer, the term of this patent is extended or adjusted under 35 U.S.C. 154(b) by 586 days.

(21) Appl. No.: 14/499,910

(22) Filed: Sep. 29, 2014

(65) Prior Publication Data

US 2015/0233352 A1 Aug. 20, 2015

(30) Foreign Application Priority Data

Feb. 14, 2014 (DE) .......................... 10 2014 002 078

(51) Int. Cl.
  *F03D 7/02* (2006.01)
  *F03D 3/00* (2006.01)
  *F03D 7/04* (2006.01)

(52) U.S. Cl.
  CPC ........... *F03D 7/0232* (2013.01); *F03D 3/005* (2013.01); *F03D 7/04* (2013.01)

(58) Field of Classification Search
  CPC .......... F03D 3/005; F03D 3/06; F03D 7/0232; F03D 7/04; F03D 3/061; F03D 3/062; F03D 3/067
  See application file for complete search history.

(56) References Cited

U.S. PATENT DOCUMENTS 8,011,886 B2 * 9/2011 Subramanian ............ F03D 1/06
                                                    416/23
2011/0255972 A1 * 10/2011 Lew ........................ F01D 5/141
                                                    416/111

FOREIGN PATENT DOCUMENTS

| CA | 2 835 398 | 1/2013 | |
|----|----|----|----|
| DE | 44 34 764 | 4/1995 | |
| DE | 298 04 581 | 7/1997 | |
| DE | 20 2008 010 290 | 12/2008 | |
| DE | 10 2009 050 577 | 12/2010 | |
| DE | 20 2011 106 051 | 1/2012 | |
| DE | 102010027003 A1 * | 1/2012 | ............ F03D 1/0641 |
| EP | 0 115 767 | 8/1984 | |
| EP | 2 623 774 | 8/2013 | |
| JP | 2001-065446 | 3/2001 | |
| JP | 2009-074447 | 4/2009 | |
| KR | 10-2012-0041722 | 5/2012 | |
| WO | WO-2007/115353 | 10/2007 | |
| WO | WO-2010/125599 | 11/2010 | |
| WO | WO-2011/013105 | 2/2011 | |

* cited by examiner

*Primary Examiner* — Richard Edgar
*Assistant Examiner* — Michael Sehn
(74) *Attorney, Agent, or Firm* — Norris McLaughlin & Marcus, P.A.

(57) ABSTRACT

A vertical wind generator with at least two blades which are rotatably mounted with regard to a central vertical rotation axis, wherein the blades each comprise a main blade with a longitudinal side and a fore blade attached to the longitudinal side of the main blade, wherein the fore blade is movable between a first position and a second position each with regard to the main blade.

9 Claims, 4 Drawing Sheets

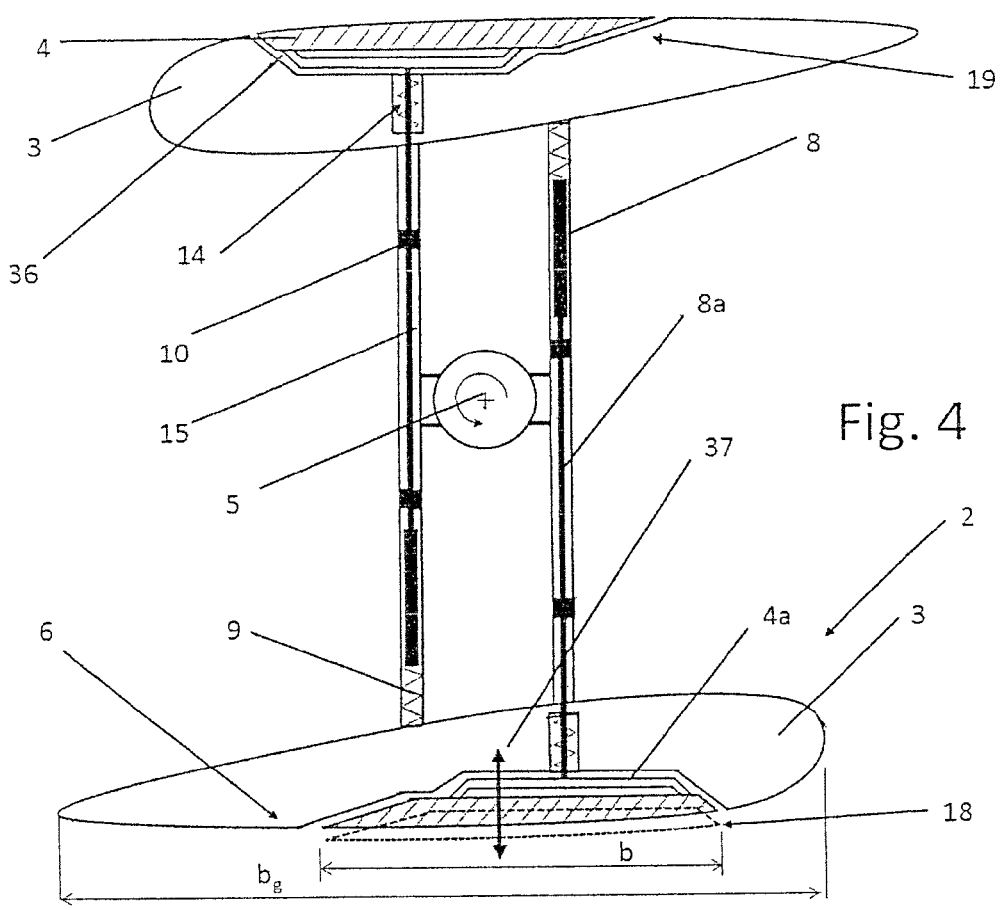

VERTICAL WIND GENERATOR

BACKGROUND OF THE INVENTION

The present invention relates to a vertical wind generator.

Wind generators or wind power plants are used for example for generating power. Thereby, the wind is harvested. Basically, two different types of wind generators are distinguished, on the one hand the so-called vertical wind generators and on the other hand wind generators having a rotor which rotates about a horizontal axis. The horizontally rotating wind generators usually have a star-shaped rotor, the rotor usually having three blades or wings. The vertical wind generators also have a vertical rotation axis and are inter alia called Darrieus rotors. One embodiment of the vertical wind generators is the so-called Darrieus H-rotor. Vertical wind generators, also called vertical axis wind turbines (VAWT), are usually independent of the wind direction, i.e., a wind tracking system or similar devices are not necessary. Such wind tracking systems consist for example of additional motors in connection with gears, bearings or sensors.

In the prior art, both vertical as well as horizontal wind generators are basically known. Both the horizontal as well as the vertical wind generators have rotors or rotor blades or wings having a constant blade surface. Wind generators having constant blade surfaces are designed for certain wind speeds, i.e., they are most efficient at merely one wind speed or in a certain range of wind speeds. At speeds not lying in and close to the optimal wind speed, i.e. at lower or higher wind speeds, efficiency of such wind generators having a constant blade surface is not ideal.

Vertical wind generators have for example difficulties in particular when starting the wind generator at low wind speeds as the blade surface is too small, i.e. they possibly need an additional starting motor. When using horizontal wind generators, for example at high wind speeds, it is needed to rotate them out of the optimal wind direction, for example also by means of an auxiliary motor, as the rotational speed or the drive of the rotor is getting too high and thus for example an overheating may occur.

DE 44 34 764 A1 describes a Darrieus wind power plant having two aerodynamically-profiled rotor blades arranged so as to rotate symmetrically and aligned parallel to one another and to a rotation axis, wherein on one end of each rotor blade a swivelling starter-flap is arranged. The starter-flaps arranged at one long side of the rotor blades are supposed to be a start-up device for the wind power plant. The starter-flaps are relatively small as regards their surface and thus have a relatively small effect. Said starter-flaps are only active during the start-up of the vertical wind power plant. Furthermore, it seems to be disadvantageous that the starter-flaps negatively influence the aerodynamical properties of the rotor blades, in particular disadvantageous swirls may occur at the edges of the wings or rotor blades.

SUMMARY OF THE INVENTION

Thus, it is an object of the present invention to provide an improved vertical wind generator and to overcome the disadvantages of the wind generators known in the prior art.

The vertical wind generator according to the present invention has at least two rotor blades or wings which are arranged rotatably in relation to a central vertical rotation axis, wherein the blades or wings each have a main blade or wing with a longitudinal side and a fore or front blade or wing attached to the longitudinal side of the main blade, wherein the fore blade is movable between a first and a second position each in relation to the main blade.

The term "longitudinal side" in the context of the present invention is supposed to mean each side or each section of the main blade extending along the length of the blade. In case of a vertically directed blade the longitudinal sides project radially outwards or inwards as well as forwards or rearwards in the rotational direction. In case of a blade which is directed radially outwards from the vertical rotation axis, the longitudinal sides project upwards or downwards as well as forwards or rearwards in the rotational direction, respectively. It is particularly preferred that the fore blade is arranged at the longitudinal side which projects forwards in the rotational direction. It is further preferred that the fore blade is attached at a longitudinal side which is directed outwards, upwards or downwards. It is also possible that a plurality of fore blades is provided at the same or at different longitudinal sides.

The vertical wind generator comprises at least two blades, the profile of which is designed preferably asymmetrically in the cross-section, for example similar to an aerodynamical profile. The asymmetric blade preferably comprises a cross-section, the width of which continuously decreases from one side to the other side. Preferably the cross-sectional profile is drop-shaped with a broader rounded side and a narrower, tapering opposite side.

The blades which are put in motion by the wind, in turn start the rotation of a central shaft rotating about a vertical central rotation axis. The vertical central shaft is generally connected to a generator serving as power generator. The blades are preferably arranged symmetrically. For example, two, four or six blades may be arranged in pairs in such a way that each two blades (or half blades) face one another.

Preferably, three blades are arranged in such a way that each pair includes an angle of 120°. The shaft usually drives a generator for generating power. In the generator mechanical (rotation) energy is converted into electric energy in the usual manner. The generator is usually directly coupled to the central shaft of the wind generator, however, a gear between the generator and the central shaft may also be provided. Furthermore, the vertical wind generator may also comprise a braking system and an emergency shutdown, as known from the prior art.

According to the present invention, the blades of the vertical wind generator are divided into a main blade and a fore blade. The main blade and the fore blade are preferably made of two separate parts which are connected to each other. The fore blade is preferably adapted to the outline of the main blade as regards shape and dimensions. The blades each have a main blade with a plurality of longitudinal sides and at least one fore blade arranged and/or mounted on at least one of the longitudinal sides of the main blade. Even if in a strictly geometrical sense the main blade may comprise more or less than four longitudinal sides depending on the blade profile (for example in case of a drop-shaped blade cross-section), in the context of the present invention the term "longitudinal side" is supposed to mean each section of the blade extending in the longitudinal direction, which is essentially directed to a predetermined direction and is also supposed to cover a longitudinal edge in a geometrical sense. In case of a vertically directed blade the longitudinal sides project radially outwards or inwards as well as forwards or rearwards in the rotational direction. In case of a blade arranged radially outwards from the vertical rotation axis the longitudinal sides project upwards or downwards as well as forwards or rearwards in the rotational direction. It is particularly preferred that the fore blade is attached at the longitudinal side directing forwards in the rotational direction. It is further preferred that the fore blade is attached at a longitudinal side directing outwards, upwards or downwards. A plurality of fore blades may also be provided at the same or at different longitudinal sides.

In case of an asymmetric cross-sectional profile of the main blade, the main blade has a first longitudinal side or longitudinal edge which is provided at the broader, rounded end of the cross-sectional profile which is directed forwards in the rotational direction, and a second longitudinal side or longitudinal edge provided on the smaller, tapered end of the cross-sectional profile. Preferably the fore blade is arranged at the first longitudinal side. Further, in case of a vertically directed blade, the main blade usually comprises a third longitudinal side pointing outwards and a fourth longitudinal side pointing inwards. In case of a blade directed radially outwards from the vertical rotation axis, the third and fourth longitudinal sides usually project upwards or downwards. It is further preferred that a fore blade is attached to the third longitudinal side.

The fore blade may also be movably integrated into the main blade. Preferably the fore blade on the side facing the main blade has a similar outer shape as the main blade or the outer surfaces are adapted to each other as regards their shape. The fore blade which is movable in relation to the main blade is preferably arranged in the wind-facing direction in front of or on the main blade.

The fore blade can preferably automatically move between a first and a second position each in relation to the main blade. When the fore blade moves relative to the main blade, preferably the distance from the fore blade to the main blade decreases. When the fore blade moves from a first to a second position the fore blade moves towards the main blade and/or a part of the fore blade moves into the main blade, i.e., advantageously the inner contour of the fore blade is form-fit put against the main blade. The inner contour of the fore blade is advantageously adapted to the outer contour of the main blade, i.e., the inner contour substantially has a similar curvature as the outer contour of the main blade. In a further advantageous embodiment the course of the outer contour of the main blade is substantially identical to the inner contour of the fore blade. Thereby, the fore blade may be fully integrated in the main blade in the second position or be received in an opening provided in the main blade.

When the fore blade moves from a second to a first position relative to the main blade, the distance between the fore blade and the main blade correspondingly increases. A movement between the first and the second position may advantageously also occur during the rotation of the wind generator, i.e., during operation. By changing the position of the first fore blade in relation to the main blade, the flow resistance of the blade advantageously changes. The flow resistance is advantageously relatively high at low speeds in order to offer as much resistance as possible against the air and in order to be able to start at low wind speeds. The flow resistance of the blades is advantageously lower at high wind speeds in order to preferably not exceed driving speeds of the vertical wind generator. It is further advantageous that the fore blade is in a further retracted position or in a completely retracted position at higher speeds, since in this way higher rotation speeds are achieved without slowing down the wind generator, which can for example be advantageous after the start-up of the wind generator.

In a preferred embodiment the vertical wind generator has a fore blade which extends over at least 50%, preferably at least 70% and particularly preferably at least 90% of the length of the longitudinal axis of the main blade. Thereby, a fore blade having a large surface may advantageously be incorporated into the outline of the blade. A fore blade essentially extending along the whole length of the main blade is particularly advantageous in case of a fore blade being attached to the longitudinal side directed forwards in the rotation direction. In case the fore blade is attached at a longitudinal side directed radially outwards, it may with regard to an optimized stability be preferred that the fore blade extends over merely 10% to 60%, preferably over 30% to 50% of the length of the longitudinal side of the main blade.

Preferably the vertical wind generator comprises a mechanism which may move the fore blade between a first and a second position each with regard to the main blade. Advantageously, the vertical wind generator has a mechanism which moves the fore blades between a first and a second position each with regard to the main blade. The mechanism is advantageously a purely mechanical, automatic mechanism. The mechanism may also advantageously be an electrical or electromechanic mechanism. An automatic mechanic mechanism advantageously does not need an additional actuator as for example an electric mechanism does.

Preferably, the vertical wind generator has a mechanism which is designed to move the fore blades at increasing wind speeds automatically towards the main blade and at decreasing wind speeds automatically away from the main blade. The mechanism moves the fore blade relatively to the main blade, i.e. at increasing wind speeds the fore blade moves towards the main blade and the distance between both is reduced or decreased. The distance between the main blade and the fore blade can thus be measured in a vertical cross-section through the main blade and the fore blade. At very low wind speeds the fore blade is in a first position, i.e. it is completely extended. At very high wind speeds the fore blade is in a second position relative to the main blade, i.e. completely retracted.

Preferably, the movement between the first and the second position is a continuous movement. Continuous movement means a constant movement relative to increasing or decreasing wind speeds. The movement does not occur jerkily or in discrete steps.

The fore blades may preferably take different intermediate positions depending on the wind speed. The intermediate positions are located between the first position and the second position, i.e., between completely extended fore blade and completely retracted fore blade. It may also be advantageous to provide different lock-in positions between the first and the second position, in which the fore blade can be adjusted by an adjusting mechanism. The adjusting mechanism preferably has at least one intermediate position and lock-in position.

Preferably one embodiment of the vertical wind generator has a mechanism with an electric motor. The electric motor is suited to actively move the fore blade between a first and a second position each in relation to the main blade. The electric motor can advantageously be connected to the fore blade via a connection element. The connection element can advantageously be a toothed belt, a chain or a rope. The connection element can be redirected via a redirection means. The redirection means may advantageously be a pulley, a pinion or a roll depending on the chosen connection element. In a particularly preferred embodiment the redirection amounts to 90°.

In a further embodiment of the vertical wind generator the mechanism comprises an electric motor and a controller. The controller is suited to move the fore blades between a first and a second position each in relation to the main blade on the basis of the determined wind data. The determined data may advantageously be determined and measured by a sensor which is integrated in the vertical wind generator. It is also possible that the wind generator has a controller which moves the fore blades in relation to the main blade by means of the submitted wind data. Submitted wind data may for example be provided via an internet connection.

In a further particularly preferred embodiment the vertical wind generator comprises a mechanical automatic mechanism which is adapted to move the fore blades between a first and a second position depending on the wind speed of the fore blades. The mechanic mechanism adjusts the position of the fore blade in relation to the main blade according to the wind speed. The adjustment of the fore blade by the mechanic mechanism does not require additional support means or additional plants.

The mechanic automatic mechanism is particularly preferably based on centrifugal force. The adjustment of the fore blade in relation to the main blade is effected via centrifugal force which is generated due to the rotation of the blade.

The centrifugal force is generated by inertia of for example a counter weight during the rotation of the wind generator around the central vertical rotation axis. The counter weight is movably mounted preferably approximately orthogonally to the rotation axis, i.e., it can move forth and back in the direction in which the centrifugal force is effective. The movement of the fore blade against the main blade preferably occurs in a direction perpendicular to the centrifugal force. The counter weight can be movably mounted in a section of the wind generator rotating about the central vertical rotation axis and can be connected to the corresponding fore blade for example via a central connection element such as a toothed belt, a chain or a rope. The connection element can in turn be redirected via a redirection means. The redirection means may be a pulley, a pinion or a roll. Advantageously the pulley, the pinion or the roll are mounted. The redirection may be effected around any angle, however, an advantageous embodiment is a redirection of 90°. Advantageously, the complete blades are connected to the vertical central rotation axis via a rod assembly. The rod assembly preferably has at least one cavity for the movable mounting of at least one counter weight. Preferably, one such cavity is provided for each of the fore blades. Preferably, the rod assembly has one or more tubes. One or more counter weights of the mechanic mechanism may be located in said tube of the rod assembly.

In a further particularly preferred embodiment the fore blade is pretensioned via an additional pressure spring. The pressure spring is advantageously located in a housing which is integrated in the main blade. The pressure spring keeps the fore blade in the extended position. The fore blade is connected to the counter weight preferably again via a connection element, for example a rope. The counter weight may be connected to a tension spring. The mechanism advantageously consists of a tension spring mounted to a fixed tube wherein the counter weight in the fixed tube is movable. The counter weight on the other hand is connected to the fore blade via a connection element, the fore blade being held in a position by the pressure spring. The whole system is generating a certain balance between the tension spring and the pressure spring.

The pressure spring keeps the fore blade preferably in a first position. The first position corresponds to the extended position. In the extended position the complete blade consisting of main blade and fore blade has the largest surface. The largest surface is adapted for low wind speeds. In the second position the fore blade is retracted. In the retracted position, the blade consisting of the fore blade and the main blade has the smallest surface. The distance between main blade and fore blade determines the complete surface of the blade.

In a further particularly preferred embodiment of the present invention the counter weight is located in the blade itself, i.e., the counter weight is integrated in the blade. By integrating the counter weight in the blade, construction space can be reduced.

For maintenance purposes it may be advantageous to provide openings in the blade in order to inspect the mechanism or possibly exchange parts of the mechanism.

The above-described embodiments of the blades are also suitable for wind power plants having a horizontal or differently directed rotation axis. Such a wind generator comprises at least two blades which are rotatably mounted with respect to a central rotation axis, wherein the blades each comprise a main blade with a longitudinal side and a fore blade mounted to the longitudinal side of the main blade, wherein the fore blade is movable between a first and a second position each in relation to the main blade. The features described above can be applied to a vertical wind generator according to the description and can freely be combined with each other.

The advantages of the invention described above are, inter alia, the arrangement of the fore blades at the longitudinal edge or longitudinal side of the main blades. By means of said advantageous arrangement, the fore blades can be mounted to the blade with a large surface having almost no interfering outlines so that both when the fore blade is retracted and when the fore blade is extended optimal aerodynamic properties exist. Further, the automatic mechanic mechanism is particularly advantageous, as there is no need for motors or the like, but instead said mechanism automatically secures the adjustment of the fore blade depending on the current wind speed, for example based on the principle of centrifugal force. This provides for a relatively simple and cost-efficient mechanism which is furthermore low-maintenance.

In the following, preferred embodiments of the present invention are described by means of the Figures.

BRIEF DESCRIPTION OF THE DRAWINGS

FIG. 3b shows a schematic view clarifying the sectional view in FIG. 3a; and

FIG. 4 shows a schematic sectional view of a further preferred embodiment of a vertical wind generator according to the present invention.

DETAILED DESCRIPTION OF THE INVENTION

Figure 1:
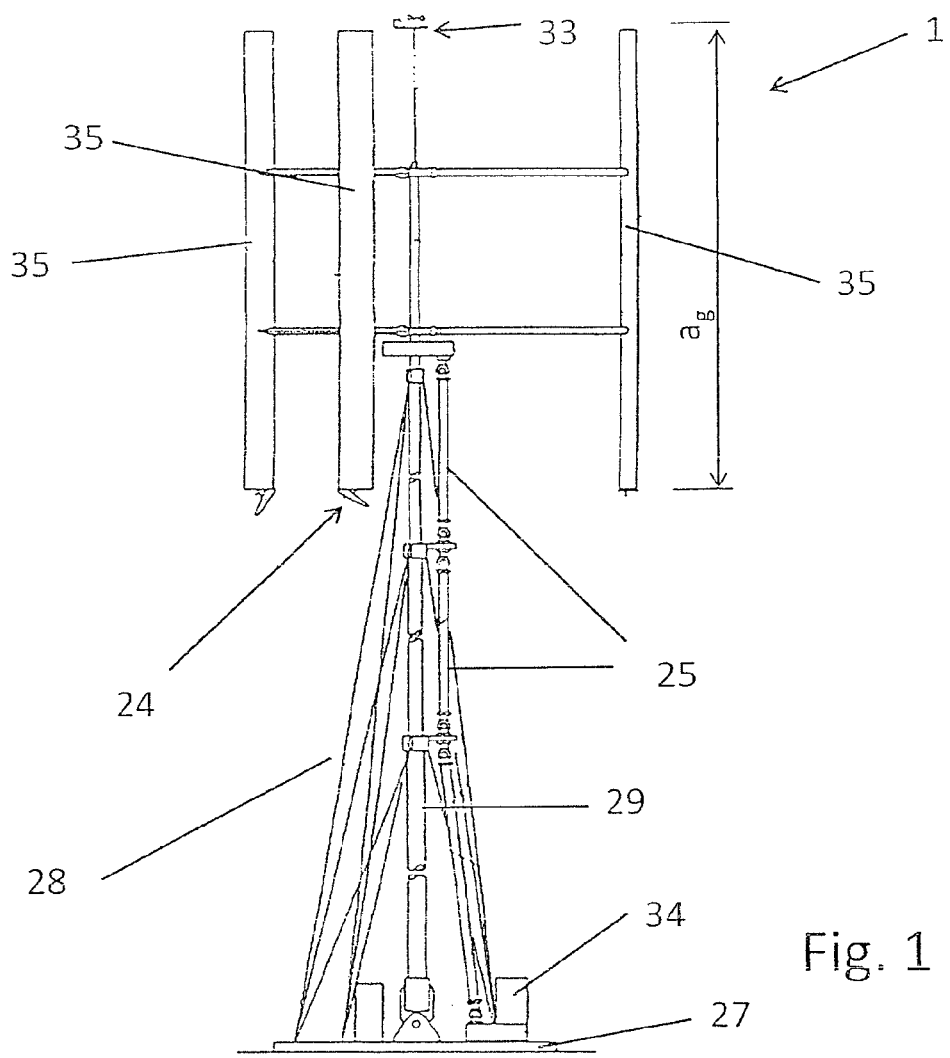
FIG. 1 shows a vertical wind generator according to the prior art in front view.

FIG. 1 shows the general structure of a generic vertical wind generator according to FIG. 1 of DE 44 34 764 A1 known from the prior art. The vertical wind generator 1 comprises three wings or rotor blades 35 which may rotate around a central vertical telescopic shaft 29. Usually, a power unit 34 for generating power is additionally connected to such vertical wind generators. The power unit 34 or the power generator is coupled to the blades for example via a transmission gearing. The vertical wind power plant 1 may be adapted in height via a central vertical telescopic shaft 29. The drive shafts 25 are provided for this purpose. The vertical wind generator 1 stands on a base plate 27. Furthermore, rope guys 28 for securing the vertical wind power plant 1 are shown in FIG. 1. At the lower ends of the rotor blades or wings 35 starting aid flaps 24 are provided. Further, a wind velocity indicator or anemograph 33 is shown. The complete length of one blade is referenced as $a_g$.

Figure 2:
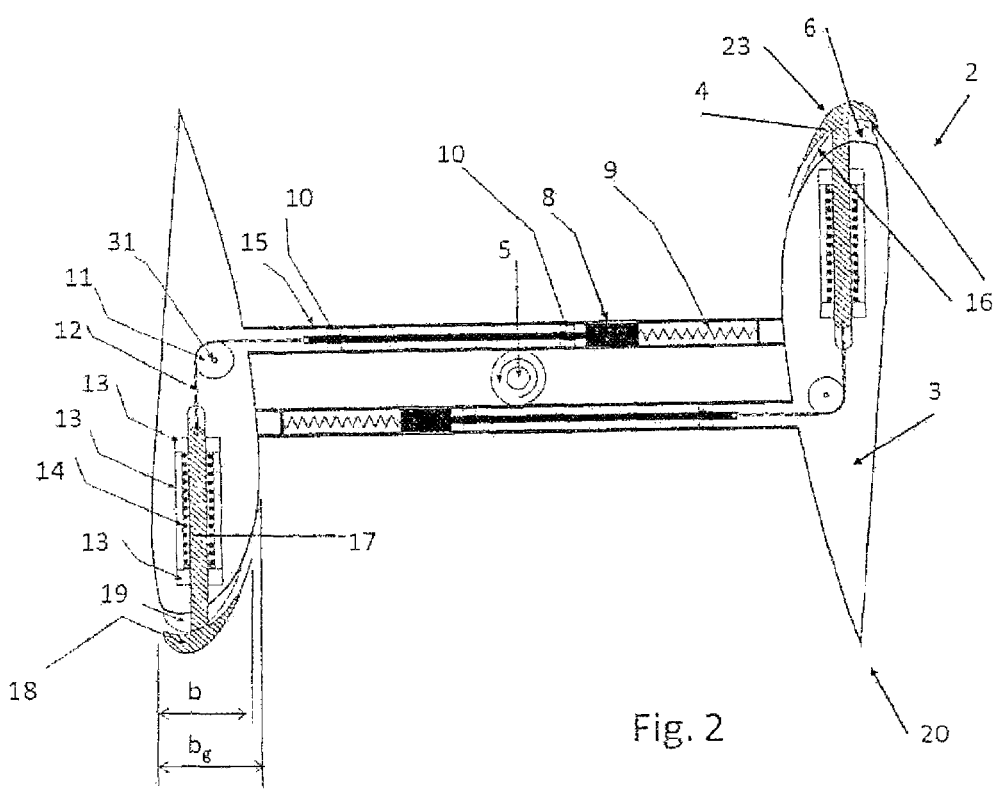
FIG. 2 shows a sectional view of a preferred embodiment of a vertical wind generator according to the present invention.

FIG. 2 schematically shows the structure of a preferred embodiment of a double blade for the vertical wind generator 1 according to the present invention, both blades 2 of which each comprises a main blade 3 and a fore blade 4. Said double blade rotates about a central vertical shaft 5, similar to the central vertical telescopic shaft 29 of FIG. 1.

The rotation direction of blades 2 about the shaft 5 is shown by an arcuate arrow thereon. Thereby, rotation takes place in such a way that the outer longitudinal rounded side 23 of the approximately drop-shaped profile of blade 2 projects forwardly. In the rotation direction, the main blade 3 is located behind fore blade 4.

At the front end (in the rotation direction) of main blade 3 there is a first longitudinal side 6 of the main blade 3. The first longitudinal side 6 extends along the complete main blade 3 (in relation to FIG. 1 top down along the blade 35). The second longitudinal side 20 of main blade 3 is located opposite to the first longitudinal side 6 of main blade 3 and is preferably tapering. Main blade 3 and fore blade 4 are preferably made of the same material. The material for the blade is preferably plastic. The blades 2 consisting of the main blade 3 and the fore blade 4 may, however, also be made of composited sheet metals.

As also shown in FIG. 2, the outline of the fore blade 4 is preferably adapted to the outline of the main blade 3, i.e., along the first longitudinal side 6 of the main blade 3 the inner side 16 of fore blade 4 is adapted to the outer outline of main blade 3. On its outer longitudinal rounded side 23 facing away from main blade 3, fore flap 4 preferably has a similar outline as main blade 3. Being in a retracted position 19 (illustration that is not hatched, left side of FIG. 2), the outline of fore flap 4 essentially merges into the outline of the main blade 3. Fore blade 4 extends along the first longitudinal side 6 (perpendicular to the plane of projection), preferably via a large part of the length of the main blade 3 or the first longitudinal side 6 of the main blade 3.

Further, FIG. 2 shows component 17, which is directly integrated in the fore flap 4, which interacts with a mechanism. Component 17 may be provided in the main blade 3 to guide the fore blade 4 and can thus also be referenced as guiding element 17. The component 17 can be formed integrally with the fore blade 4 or can also be formed as a separate part and, as such, be connected to the fore blade 4 via screws, rivets or adhesion.

The shown mechanism essentially consists of a tension spring 9, a counter weight 8, a connection element 12, a redirection means 11, a pressure spring 14 and the fore blade 4. The tension spring 9 is preferably mounted to the counter weight 8. The tension spring 9 may be replaced by any elastic element, for example an elastic band or the like. The shown mechanism further contains a pressure spring 14. The pressure spring 14 may be replaced by elements having similar mechanical properties—building up force by compression, stored energy is released when tension is released—for example a gas pressure spring or an elastic element. As also shown in FIG. 2, in this mechanic mechanism the fore blade 4 may be maintained in the extended position 18 (hatched illustration of fore blade 4) via the pressure spring 14. In said embodiment the pressure spring 14 is located in a housing 13. The housing 13 is preferably formed integrally with the main blade 3 or as a separate element fixed in the main blade 3 or holds itself up against the main blade 3. The pressure spring 14 is in contact with the fore blade 4 or with the guiding element 17 of the fore blade 4 via a further connection element, for example a projecting cam, a pin or a wave shoulder. Hence, the spring force of the pressure spring 14 can directly act on the fore blade or its guiding element 17. The different components of the mechanism are configured according to the predominant forces, the dimensions of the blade and/or the usually occurring wind speeds.

Furthermore, a connection element 12 connecting the counter weight 8 to the fore blade 4 can be part of the mechanism. When the mechanism is mechanically operated, as shown in FIG. 2, the counter weight 8 is connected to the connection element 12 and the fore blade 4. The mechanism contains a tension spring 9 being in mechanical connection with the counter weight 8. According to said embodiment, the counter weight 8 is guided via additional bearings 10, which may for example be slide bearings, in the cavity of a rod assembly or tube 15. The additional guiding of the bearings 10 enables a linear movement. According to the embodiment, the connection element 12 is redirected via a redirection means 11. The connection element 12 may for example be a toothed belt, a (wire) rope or a chain. The redirection means 11 may correspondingly comprise a pulley, a return pulley, a pinion or the like. The redirection means 11 in FIG. 2 has a vertical bearing 31 about which the redirection means 11 rotates.

The counter weight 8 may also be composed of separate components so that the vertical wind power plant 1 may be optimally adjusted according to the location where it is used and the wind regime occurring there. The counter weight 8 may be composed of different materials or the same materials. Preferably materials having a high density are used, for example steel, particularly preferred stainless steel. A separate counter weight for each fore blade may be provided, as shown. Alternatively, a counter weight having two or more fore blades may also be connected via corresponding connection elements and redirection means.

In the shown embodiment the main blade 3 is connected to the central shaft via a rod assembly 15. Furthermore, the main blade 3 is directly connected via the rod assembly 15 to a second main blade 3 in such a way that both main blades 3 form a double blade. Alternatively, two or more blades may be mounted separately directly to the central shaft 5.

Further, in FIG. 2 (left side) the extended position 18 of fore blade 4 in relation to main blade 3 is shown. The fore blade which is not hatched in the illustration shows the retracted position 19 of fore blade 4. In the extended position 18 of blade 2, blade 2 has the largest aerodynamically active surface. The active total surface of blade 2 consists of the active surface of main blade 3 and the active surface of fore blade 4. The aerodynamically active surface means the surface where the wind may hit or which significantly contributes to harvesting the wind energy. A larger aerodynamically active total surface usually means a higher flow resistance of the blades. Due to the large active total surface or large area exposed to the wind in an extended position 18 of the fore blades, the vertical wind generator according to the present invention is adapted to also start at low wind speeds and to be also operated efficiently at low wind speeds or to efficiently harvest wind. At higher wind speeds, both fore blades 4 are pulled towards the main blades 3 against the force of both pressure springs 14 due to the higher centrifugal force on the counter weights 8, so that the aerodynamically active total surface correspondingly reduces. Hence, the efficiency at high wind speeds is optimized or it is made possible to operate the wind generator also at high wind speeds. With slower winds and accordingly reduced rotation speeds, the pressure force of the pressure springs 14 outweighs the centrifugal force and thus presses the fore blades 4 away from, i.e. at distance to, the main blade 3. At the same time both tension springs 9 are stretched via the tension element 12. Both tension springs 9 help to dynamically stabilize the system in order to avoid vibrations or hypersensitivity of the whole system. Due to the balance of the forces between centrifugal force and pressure force of the pressure spring, basically each intermediate position can be taken depending on the occurring wind speeds.

In order to achieve the greatest possible effect, fore blade 4 extends preferably over at least 50%, more preferably at least 70% and most preferably over at least 90% of the length of the main blade (i.e. in a direction perpendicular to the drawing plane). It is further preferred that the projection of fore blade 4 (referenced as b in FIG. 2) on the width of the main blade 3 (referenced as $b_g$ in FIG. 2) is at least 50%, more preferably at least 70% and particularly preferably at least 90% of the width of the main blade.

In a further preferred embodiment the mechanism may contain an electric motor, wherein the electric motor may be connected to the fore blade 4 via the connection element 12. Said composition may also interact with mechanical components such as for example a pressure spring. A controller calculates the optimum position of the fore blade 4 with the help of (wind) data or corresponding parameters. An electric motor moves the fore blades 4 into the correspondingly calculated position, which is, according to the wind speed, either in an extended position 18 or in a retracted position 19 or in an intermediate position. The controller is advantageously based on data measured for example by a wind velocity indicator 33 (FIG. 1) or also on (weather) data which may for example be provided by the internet. The electric motor may advantageously also be configured as linear motor. Advantageously, the electric motor is operated by the harvested wind energy.

Figure 3A:
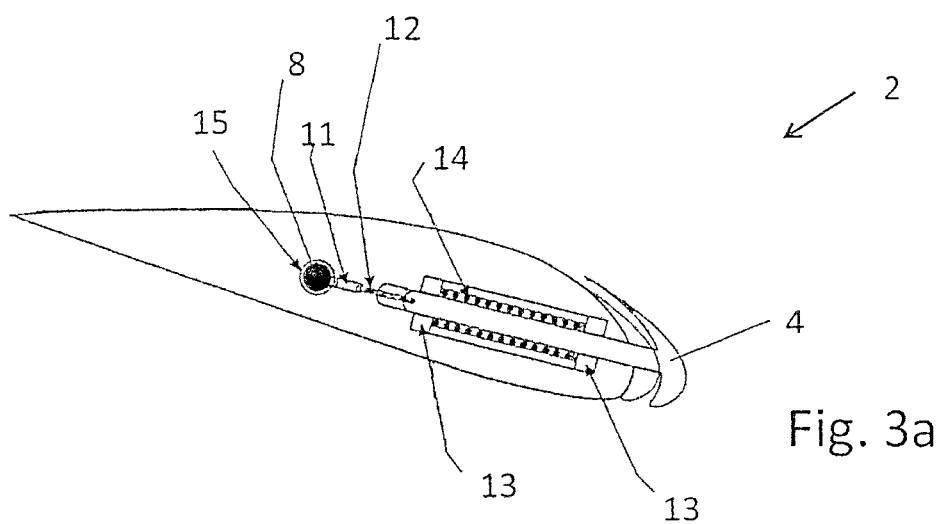
FIG. 3a shows a sectional view of a further preferred embodiment of a vertical wind generator according to the present invention.
Figure 3B:
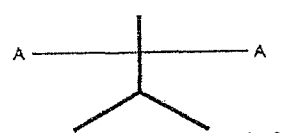

Further, a schematic top view of a further preferred embodiment of a vertical wind generator 1 is shown in FIG. 3b. The cut A-A identified in the illustration shows the position of the cut through a main blade 3 of a further preferred embodiment shown in FIG. 3a. As shown in said schematic sectional view, according to this embodiment the blades do not extend vertically (as in FIG. 1) but horizontally, i.e. the three main blades extend radially outwards from a central shaft. According to this embodiment, the mechanism for the automatic movement of fore blade 4 against main blade 3 works analogously to the mechanism of the embodiment of FIG. 2. However, in this embodiment the counter weight 8 is advantageously integrated in main blade 3, as the centrifugal force here acts along the longitudinal axis of the main blade. Since also in this case the movement direction of the fore blade is essentially perpendicular to the direction of the centrifugal force, a redirection means as described above is preferably provided. Also the combination of pressure spring and tension spring can be used in this embodiment. Preferably, the complete mechanism described above in relation to FIG. 2 is located in the main blade 3 of this embodiment. This may inter alia be advantageous when installing a corresponding vertical wind generator 1. Similar to the embodiment according to FIG. 2 the mechanism of this embodiment may be configured mechanically or have an electric motor.

FIG. 4 shows a further preferred embodiment of the vertical wind generator according to the present invention. This embodiment basically corresponds to the embodiments of the vertical wind generator according to the present invention discussed above having at least two blades 2 which are movably mounted in relation to a central vertical rotation axis, wherein the blades 2 each have a main blade 3 having a longitudinal side 6 corresponding to the outer side of the main blade 3, and a fore blade 4 mounted to the longitudinal side 6 of the main blade 3, wherein the fore blade 4 is movable between a first and a second position each in relation to the main blade 3. The fore blade 4 is shown in a retracted position 19. Preferably, the fore blade 4 is formed in a bevelled or tapered manner on at least one side, preferably on the front and the back side, so that the aerodynamics of fore blade 4 is improved.

The outer side means the side of blade 2 which faces away from a central vertical shaft 5. In this embodiment, the fore blade 4 moves in an effective direction or along the same axis as the counter weight 8. Due to said preferred arrangement a redirection by means of a redirection means 11 and a flexible connection element 12 as in FIG. 2 is not necessary. Instead, the connection between fore blade 4 and counter weight 8 is achieved preferably by means of a fixed connection, for example by means of a rod assembly 8a. Thereby, losses due to redirection in the connection mechanism can be reduced. The indirect connection via the carrier element 4a is merely an example therefor.

Also in this embodiment, pressure spring 14 presses fore blade 4 outwards, if no centrifugal force is effective on the counter weight 8, which then moves the fore blade inwards against the pressure force of the pressure spring 14. The additional, optional tension spring 9 has the purpose of dynamic stabilisation. In this embodiment, tension spring 9 and pressure spring 8 may also be exchanged with each other due to the rigid rod assembly 8a.

The rod assembly 8a is guided via bearing 10 together with counter weight 8 in the rod assembly 15 having a cavity. The rod assembly 15 is connected to shaft 5. Shaft 5 operates directly or indirectly (interconnected gear) a generator for generating power (not shown). In FIG. 4 the fore blade 4 in the extended position 18 is shown by a dashed line. The movement direction of fore blade 4 is depicted schematically by arrow 37. The movement direction of fore blade 4 according to this embodiment is advantageously substantially perpendicular to the outer side or longitudinal side 6 of blade 2. Due to the recess 36 in main blade 3, fore blade 4 may completely be integrated in main blade 3 along its longitudinal side. Recesses 36 may also be advantageous in further embodiments of the present invention. Advantageously, a fore blade 4 may be adapted at its outer side to the outline of main blade 3.

In the embodiment of a vertical wind generator 1 according to the present invention, which is shown in FIG. 4, it is further advantageous that fore blade 4 extends over 10% to 60%, preferably over 30% to 50% of the length of the main blade. It is further preferred that the projection of fore blade 4 (referenced as b in FIG. 4) to the width of main blade 3 (referenced as $b_g$ in FIG. 4) is at least 30%, more preferably at least 50% and particularly preferably at least 70% of the width of the main blade.

The embodiment shown in FIG. 4 may also be provided with an electric motor for adjusting the position of fore blade 3 instead of a mechanic mechanism.

The features of the different embodiments according to the present invention may also be combined with each other, for example also the mechanism of the embodiment shown in FIG. 4 may be integrated in the main blade of the wind generator according to the remaining embodiments.

The invention claimed is:

1. A vertical wind generator, comprising at least two blades which are rotatably mounted with regard to a central vertical rotation axis, wherein the blades each comprise a main blade with a longitudinal side and a fore blade attached to the longitudinal side of the main blade, wherein the fore blade is movable between a first position and a second position each with regard to the main blade, wherein each blade further comprises a mechanical and automatic mechanism which is adapted to move the fore blade in relation to the main blade between the first position and the second position based solely on centrifugal force.

2. The vertical wind generator according to claim 1, wherein the fore blade extends over at least 50% of the length of the longitudinal side of the main blade.

3. The vertical wind generator according to claim 1, wherein the fore blade extends over at least 70% of the length of the longitudinal side of the main blade.

4. The vertical wind generator according to claim 1, wherein the fore blade extends over at least 90% of the length of the longitudinal side of the main blade.

5. The vertical wind generator according to claim 1, wherein the mechanism is adapted to move the fore blade toward the main blade at increasing wind speeds and to move the fore blade away from the main blade at decreasing wind speeds.

6. The vertical wind generator according to claim 5, wherein the movement between the first and the second position is carried out continuously.

7. The vertical wind generator according to claim 5, wherein the fore blade may take different intermediate positions depending on the wind speed.

8. The vertical wind generator according to claim 7, wherein the fore blade may take each intermediate position between the first and the second position.

9. The vertical wind generator according to claim 1, wherein the centrifugal force is generated only by wind acting on the blades and the mechanical and automatic mechanism does not include and is not associated with any sensor, controller or motor or other power source.

* * * * *